(12) United States Patent
Chew (10) Patent No.: US 8,661,166 B2
(45) Date of Patent: Feb. 25, 2014

(54) DFX SOFTWARE DEBUG FEATURE FOR IO AND OTHER NON-MEMORY TYPED TRANSACTIONS

(75) Inventor: Yen Hsiang Chew, Penang (MY)

(73) Assignee: Intel Corporation, Santa Clara, CA (US)

( * ) Notice: Subject to any disclaimer, the term of this patent is extended or adjusted under 35 U.S.C. 154(b) by 126 days.

(21) Appl. No.: 12/639,868

(22) Filed: Dec. 16, 2009

(65) Prior Publication Data
US 2011/0145443 A1 Jun. 16, 2011

(51) Int. Cl.
*G06F 3/00* (2006.01)
(52) U.S. Cl.
USPC .......................................................... 710/15
(58) Field of Classification Search
None
See application file for complete search history.

(56) References Cited

U.S. PATENT DOCUMENTS

| | | | | |
|---|---|---|---|---|
| 5,793,993 A | * | 8/1998 | Broedner et al. | 710/106 |
| 6,044,225 A | * | 3/2000 | Spencer et al. | 710/52 |
| 6,247,101 B1 | * | 6/2001 | Settles | 711/145 |
| 7,406,711 B2 | * | 7/2008 | Fuchs et al. | 726/21 |
| 7,533,201 B2 | | 5/2009 | Chew | |
| 2003/0120802 A1 | * | 6/2003 | Kohno | 709/237 |
| 2005/0223296 A1 | * | 10/2005 | Usui | 714/39 |
| 2008/0219279 A1 | | 9/2008 | Chew | |
| 2008/0237310 A1 | | 10/2008 | Periaman et al. | |
| 2008/0315388 A1 | | 12/2008 | Periaman et al. | |
| 2008/0315421 A1 | | 12/2008 | Periaman et al. | |
| 2009/0019196 A1 | | 1/2009 | Chew et al. | |
| 2009/0065951 A1 | | 3/2009 | Cheah et al. | |
| 2009/0249090 A1 | * | 10/2009 | Schmitz et al. | 713/300 |

OTHER PUBLICATIONS

"Periodic SMI (PSMI) Failures Reproduction Methodology," *Intel Technology Journal*, vol. 7, issue 2 (May 2003), 41.

* cited by examiner

*Primary Examiner* — Henry Tsai
*Assistant Examiner* — Aurangzeb Hassan
(74) *Attorney, Agent, or Firm* — Blakely, Sokoloff, Taylor & Zafman LLP

(57) ABSTRACT

A system and method for monitoring a data-path between a plurality of devices which are communicably interfaced with a bus for a transaction. The transaction is copied to a replicate transaction, and the original transaction is allowed to proceed to whichever of the plurality of devices to which it is uniquely addressed according to the transaction. A destination address of the replicate transaction is modified to a specified memory device which is also communicably interfaced with the bus, and the replicate transaction is then released onto the data-path, thus allowing the replicate transaction to proceed to the specified memory device based on the modified destination address.

23 Claims, 7 Drawing Sheets

FIG. 4

DFX SOFTWARE DEBUG FEATURE FOR IO AND OTHER NON-MEMORY TYPED TRANSACTIONS

TECHNICAL FIELD

Embodiments of the invention relate to the field of computer networking, and more particularly, to monitoring a data-path at a system bus level for transactions and replicating select transactions to a specified memory device for diagnostic purposes.

BACKGROUND

Diagnostic tools and methodologies are a critical aspect to software and hardware design and facilitate the development of a stable, efficient, and mature computing environment. Diagnostic or "debug" tools are wide ranging, but one common technique is to analyze the state of a computing system's hardware or software to determine whether or not the information possessed by a particular hardware component or logic component is correct.

For example, it may be necessary in diagnosing correct operation of a hardware device to determine whether or not a particular hardware component is operating with the correct flags, values, or states. Such information may be stored via hardware registers or in operational memory. Similarly, a logic module may be diagnosed by analyzing values utilized by the logic module, whether those values are stored in an on-chip cache memory, off chip cache, or in a separate memory module that supports the operation and execution of commands and instructions performed by the logic module.

A common conventional mechanism for obtaining such information from an executing logic module or from a hardware device is to write a specifically targeted instruction that retrieves the required value during an execution loop and then outputs the value to a computer monitor or to a log file. A disadvantage of this approach is that a particular instruction set must be written and executed for every value to be obtained. Moreover, the debug instruction must be introduced to the actual program being diagnosed, or to a custom application which obtains values from the hardware to be diagnosed, and these instructions add additional complexity, execution overhead, and may themselves never be executed if the software or hardware being diagnosed crashes or halts prior to execution of the diagnostic instruction introduced.

Another mechanism for capturing and analyzing state information from an executing hardware device or logic unit is through the use of a logic analyzer. Logic analyzers permit a user to connect "probes" to various hardware connection points, such as Field Programmable Gate Arrays (FPGAs) or to a communication bus, and then monitor signals passing through that location. Software in the logic analyzer then permits the monitored signal to be correlated to certain events, such as a particular state or an instruction passing through that point. Unfortunately, logic analyzers are limited due to the fact that they require the use of "probes" or "clips" that attach physically to the system to be monitored. There are, for example, constraints on the number of probes that may be physically connected to a particular system, and a logic analyzer is further limited as to the number of signal pins it may support, for example, a particular logic analyzer may be limited to 32 distinct signal pin probes, thus limiting the user to selecting only 32 signals to monitor, among potential hundreds or thousands available in a complex system.

Further still, the signal obtained by a logic analyzer must be translated, mapped, or corresponded with a particular event or instruction, and in the process, some detail or information may be lost. Although the logic analyzer has a view of the signals within the system through its "probes," these signals do not necessarily correspond precisely with the signals traversing the probed location, but rather, they are signals as viewed through the logic analyzer's own hardware and probe lead, which can potentially introduce small differences, or account for the inability to correlate the viewed signal to a precisely corresponding transaction as received by a target device within the system being diagnosed.

BRIEF DESCRIPTION OF THE DRAWINGS

Embodiments of the present invention are illustrated by way of example, and not by way of limitation, and can be more fully understood with reference to the following detailed description when considered in connection with the figures in which.

DETAILED DESCRIPTION

Described herein are systems, devices, and methods for monitoring a data-path on a bus for transactions and replicating those transactions to a specified storage location without interrupting or otherwise affecting the original transaction.

In one embodiment, a data-path is monitored between a plurality of devices which are communicably interfaced with a bus. The transaction is copied to a replicate transaction, and the original transaction is allowed to proceed to whichever of the plurality of devices to which it is uniquely addressed according to the transaction. A destination address of the replicate transaction is modified to a specified memory device which is also communicably interfaced with the bus, and the replicate transaction is then released onto the data-path, thus allowing the replicate transaction to proceed to the specified memory device based on the modified destination address.

In a particular embodiment, the transaction originally placed upon the data-path continues on to its original destination as originally and uniquely addressed, typically one of many peripheral devices communicably interfaced with the bus. The transaction itself, the originating device, and the target or destination peripheral device need not be aware (e.g., need not be able to detect) that the transaction was replicated, and indeed may very well not be aware or detect that the transaction was replicated. In such an embodiment, the original transaction is processed at the originally specified destination address in a usual manner.

In a particular embodiment, the replicate transaction is placed, inserted, or introduced upon the data-path to progress to a specified memory device or specified storage location via the bus, where it is then processed by the specified memory device or storage location. For example, processing the replicate transaction at the specified memory location or storage location may include storing the replicate transaction itself as a representation of the original transaction.

Certain functionality described herein may be performed by a command mailbox which is installed into a system as, for example, a peripheral device communicatively interfaced with a bus of the system. To be very clear however, the command mailbox which is capable of carrying out its described functions is claimed separately, may be manufactured and sold separately, or may alternatively be integrated into a system at manufacture and sold with such a system, such as that which is also claimed herein.

In the following description, numerous specific details are set forth such as examples of specific systems, languages, components, etc., in order to provide a thorough understanding of the various embodiments of the present invention. It will be apparent, however, to one skilled in the art that these specific details need not be employed to practice the disclosed embodiments of the present invention. In other instances, well known materials or methods have not been described in detail in order to avoid unnecessarily obscuring the disclosed embodiments.

In addition to various hardware components depicted in the figures and described herein, embodiments of the present invention further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments of the present invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments of the present invention are not described with reference to any particular programming language. It will be appreciated that a variety of programming languages may be used to implement the teachings of the embodiments as described herein.

Embodiments of the present invention may be provided as a computer program product, or software, that may include a machine-readable medium having stored thereon instructions, which may be used to program a computer system (or other electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Figure 1:
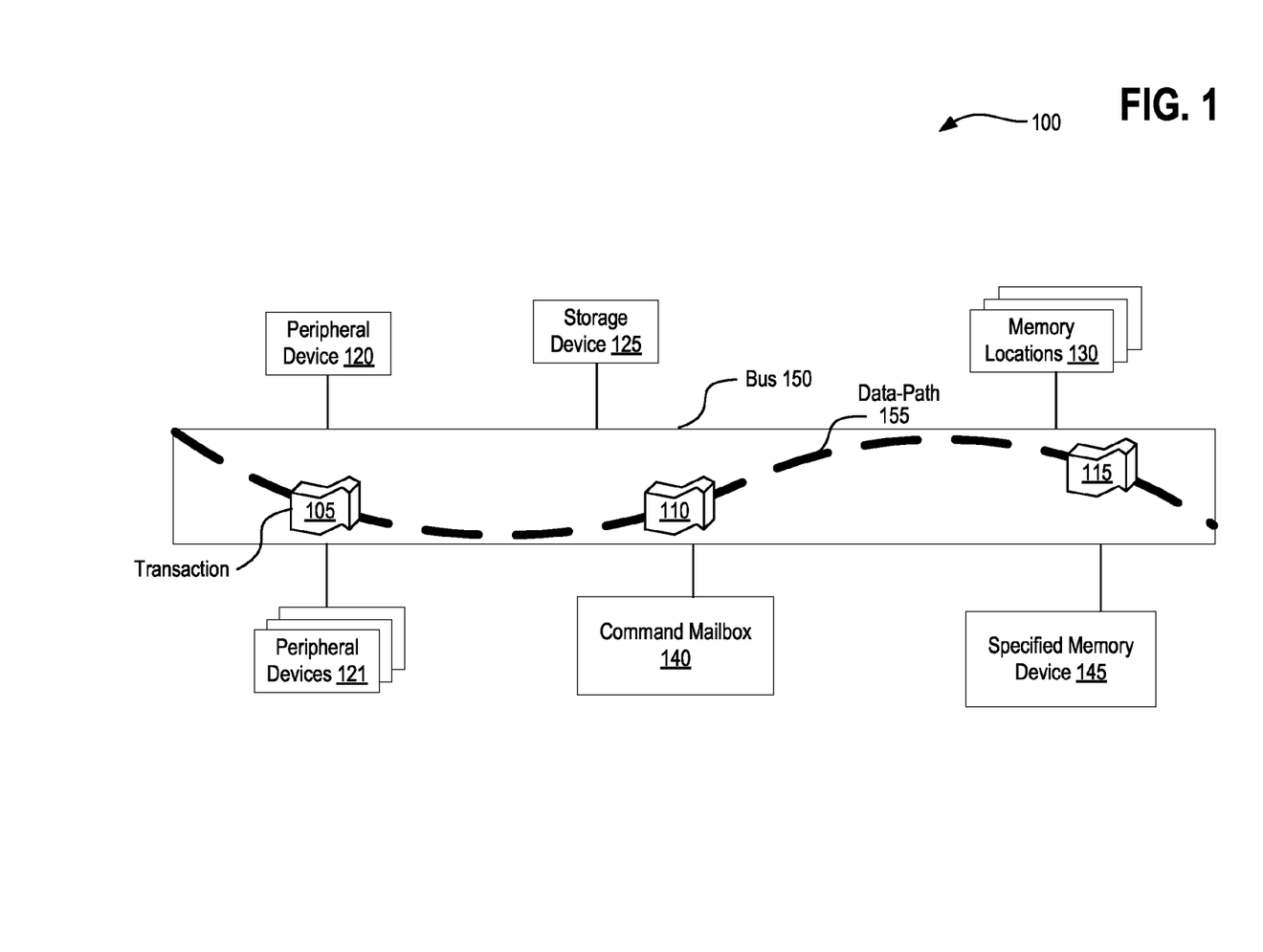
FIG. 1 illustrates an exemplary architecture in which embodiments of the present invention may operate.

FIG. 1 illustrates an exemplary architecture 100 in which embodiments of the present invention may operate. Architecture 100 includes bus 150 having data-path 155 within, or upon it. A plurality of transactions, such as transactions 105, 110, and 115 are shown traversing data-path 155 via bus 150 between multiple peripheral devices communicably interfaced with the bus, and by extension, communicably interfaced into the data-path. For example, general peripheral devices 120, 121 are shown, as are more specific peripheral devices which are communicatively interfaced to the bus including storage device 125, command mailbox 140, memory locations 130, and specified memory device 145.

Bus 150 may be a communication transportation mechanism integrated into a computing device for interfacing multiple computing components together so that they may communicate amongst each other (e.g., communication busses, backbone busses, backplane busses, transport busses, etc.). Such computing components may include those depicted within FIG. 1 such as peripheral devices 120 and 121, storage device 125, memory locations 130, and so forth. Such devices may be, for example, hard disk drives, computer processors (e.g., central processing units), operational memory (e.g., various types of random access memory (RAM) including Double Data Rate synchronous dynamic random access memory (DDR SDRAM), DDR2, flash-based ram, memory controllers, dedicated audio and/or video processing devices, storage controllers, wired and/or wireless communication/networking devices, PCI (Peripheral Component Interconnect local interconnect) Express and USB hosts and/or bridge devices, as well as other various peripheral devices which are commonly integrated with, or installed into a computing device or system.

Data-path 155 represents a signal traversing the physical communication bus itself, which is detectable (e.g., observable, viewable) by the various peripheral devices and components which are communicatively interfaced with the bus. Transactions 105, 110, and 115 may be embodied within the data-path as a digital or analog signal, and represented in an appropriate format, structure or protocol that corresponds to the underlying computing device or system in which the transactions are present. For example, distinct transactions may be decipherable based upon training sequences, distinct block lengths, clock cycles, and so forth.

FIG. 1 further depicts that command mailbox 140 may be integrated with, or communicably interfaced to bus 150 so that the command mailbox has a view of the data-path and can therefore monitor the various transactions (e.g., 105, 110, 115) traversing the data-path between the various components and peripheral devices (e.g., 120, 121, 125, 130, 145) via the bus. The command mailbox 140 may be interfaced with the bus 150 and monitor transactions traversing the bus 150, or the command mailbox 140 may be interfaced between the bus 150 and one or more of the peripheral devices (e.g., 120, 121, 125, 130, 145), and monitor transactions at a point between the bus 150 and the one or more peripheral devices.

Figure 2:
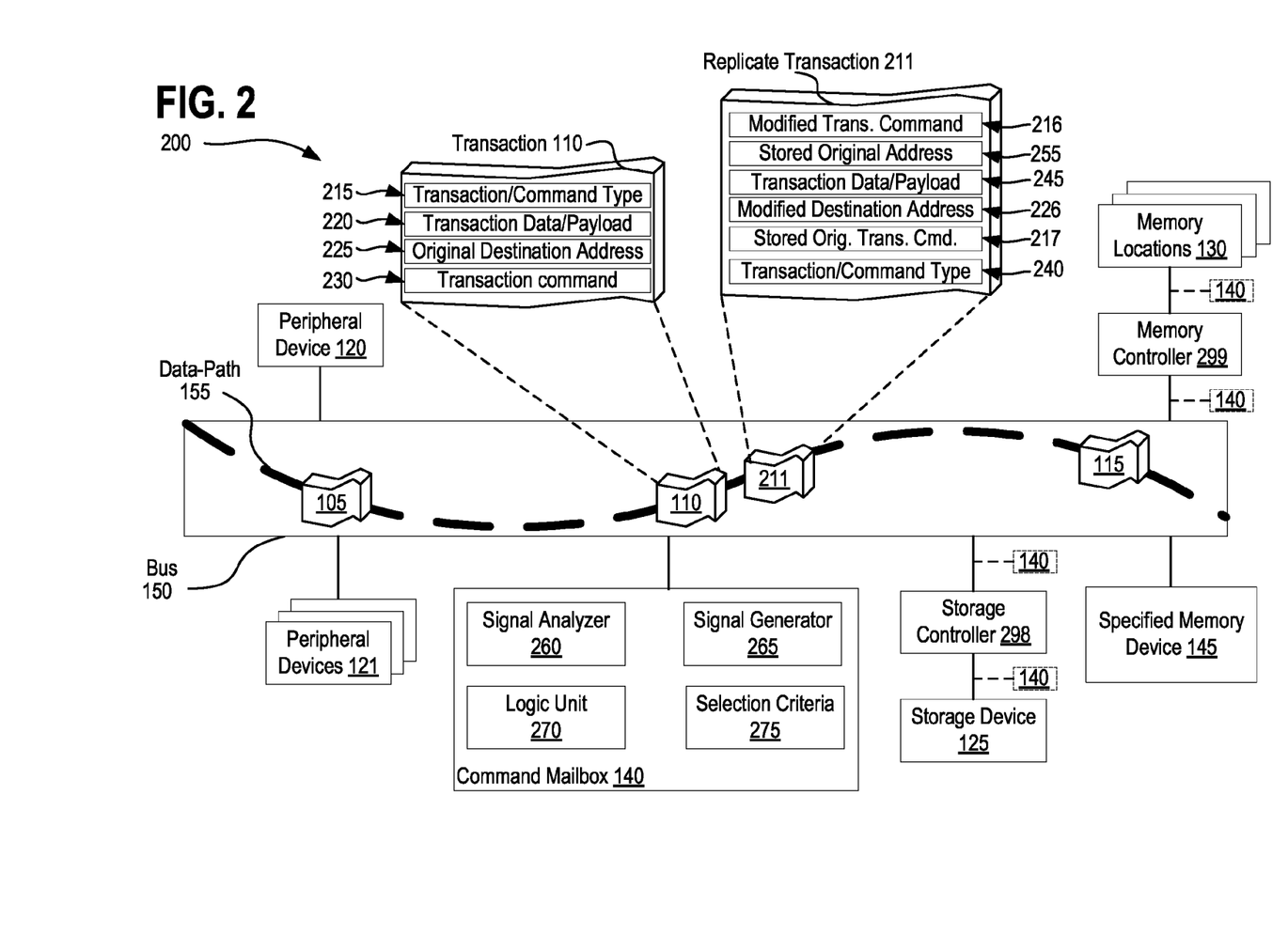
FIG. 2 is illustrates an alternative architecture in which embodiments of the present invention may operate.

FIG. 2 illustrates an alternative architecture 200 in which embodiments of the present invention may operate. For example, additional detail of transaction 110 is depicted, as well as replicate transaction 211, which is a modified copy, instance, or version which is generated from transaction 110. Further still, corresponding detail of replicate transaction 211 and additional sub-component detail of command mailbox 140 is depicted.

In a particular embodiment, the data-path 155 is monitored between a plurality of devices (e.g., 120, 121, 125, 130, 145) communicably interfaced with a bus 150 for a transaction (e.g., 105, 110, or 115) uniquely addressed to one of the plurality of devices (e.g., one of 120, 121, 125, 130, or 145).

In one embodiment, monitoring the data-path 155 for the transaction among the plurality of transactions traversing the data-path (e.g., monitoring for transaction 110 among transactions 105, 110, and 115) includes or is followed by selecting the transaction (e.g., 110) from among the plurality of transactions traversing the data-path (e.g., transactions 105, 110, and 115) based on a user specified transaction type 215 of the transaction. Transaction type 215 may be selected based on a user input or stored user preference. The transaction type may be selected from transaction types including an Input/Output (IO) read/write request, a configuration read/write request, a transaction acknowledgement, an interrupt request, or any other transaction type supported by the bus architecture.

In one embodiment, the transaction (e.g., 110) is copied to a replicate transaction 211 and transaction 110 is allowed to proceed to one of the plurality of devices as uniquely addressed by transaction 110 without interruption. For example, the transaction 110 proceeds based on the original destination address field 225 of transaction 110. In an alternative embodiment, the transaction 110 is copied to a replicate transaction 211 based on a user selection of the fields of the transaction 110 to be replicated from among a plurality of fields available for replication in the replicate transaction. For example, although many fields may be available to store in the replicate transaction and later stored in a specified memory location (e.g., based on a user input or saved user preference) for debug, a user may only wish to store transaction commands and addresses of the original transaction 110 in the replicate transaction 211, while ignoring, for example, an available payload field.

In one embodiment, a destination address 226 of the replicate transaction 211 is modified (e.g., changed, updated, altered) to a specified memory device (e.g., 145) communicably interfaced with the bus 150. The destination address 226 of the replicate transaction 211 may be changed to a mass storage device based on a user input or a stored user preference, a memory device, a memory location or range of locations (e.g., 130) in a memory device, and so forth.

In an embodiment, the replicate transaction 211 is released onto the data-path 155, thus allowing the replicate transaction (211) to proceed to the specified memory device 145 based on the modified destination address 226.

In a particular embodiment, transaction 110 (e.g., the original transaction that was replicated) proceeds to a target device specified as by original destination address 225 of the original transaction 110 for processing in its usual manner in accordance with, for example, a transaction or command type represented within transaction 110 at element 215 or at element 240 as copied to replicate transaction 211, transaction data or a "payload" carried by or within transaction 110 as represented by element 220 within transaction 110 or at element 245 as copied to replicate transaction 211, an original destination address for transaction 110 which corresponds to and uniquely addresses only one individual peripheral device communicably available within a computing system as represented by element 225 of transaction 110, or a transaction command (e.g., a request, demand, or instruction carried with the transaction) as represented at element 230 within transaction 110. Processing may be, for example, storing a write request at a memory or storage location, retrieving data specified by a read request from a storage or memory location, processing audio or video data at an audio or video device as appropriate, performing a transmit and/or receive function at a communication device, and so forth.

In one embodiment, the one device of the plurality of devices which is uniquely addressed by the transaction 110 is a "target device" of the transaction that corresponds to an original destination address 225 of the transaction 110.

In one embodiment, the replicate transaction 211 which is copied from an original transaction (e.g., transaction 110) includes the original information embodied by the original transaction 110 (such as data which corresponds with elements 215, 220, 225, and 230 of transaction 110), but in a slightly modified form, so that the replicate transaction may be processed appropriately. For example, besides modifying the destination address 226 of replicate transaction 211, the replicate transaction may include a modified transaction command 216. To maintain a true representation of the original transaction, in one embodiment, the original destination address of the original transaction 110 may be stored separately within the replicate transaction as a stored original address (destination address), for example, at element 255.

Similarly, in a particular embodiment, the original transaction command of transaction 110 may be stored separately within the replicate transaction as a stored original transaction command, for example, at element 217. Further still, an origination address associated with the original transaction 110 is separately stored within replicate transaction 211, so that the address or peripheral device that initiated or generated the original transaction 110 may be later identified within the replicate transaction 211. Origination addresses may further include any other information that identifies the originator of the transaction, such as device tags and/or device identifiers (IDs) available with some bus architectures. For example, some bus architectures support a unique request signal for each particular device connected to the bus, which may be used to identify the originator of the transaction, and thus be considered an origination address.

FIG. 2 further depicts an additional substructure of command mailbox 140, including signal analyzer 260, signal generator 265, selection criteria 275, and logic unit 270. In a particular embodiment, monitoring of the data-path 155 between the plurality of devices (120, 121, 125, 130, 145) communicably interfaced with the bus 150 for the transaction (e.g., transaction 110) includes signal analyzer 260 monitoring signals traversing the data-path 155 and interfaced to the bus 150 through the command mailbox 140. For example, the signal analyzer 260 may continuously decipher a signal traversing the data-path 155 in accordance with a set protocol or standard to extract and view data embodied within the signal, such as data corresponding to or embodied by the various transactions (e.g., 105, 110, 115).

In a particular embodiment, generating the replicate transaction 211 from transaction 110 and modifying the destination address 226 of the replicate transaction 211 is performed by signal generator 265 which is communicably interfaced with the bus 150 through the command mailbox 140. For example, the signal generator 265 may be communicably interfaced with logic unit 270 which provides a revised or modified destination address 226 for the replicate transaction, which the signal generator 265 then implements within the replicate transaction in the form of a signal which is introduced into the data-path 155 to traverse the bus 150.

In one embodiment, a mailbox peripheral device or command mailbox (e.g., element 140) performs the monitoring, selecting, modifying, replicating, and signal generation/insertion functions described above. In such an embodiment, the mailbox peripheral device is communicably interfaced with the bus 150 or communicably interfaced on a bus between two or more of the peripheral devices, such as between memory locations 130 and memory controller 299, between storage device 125 and storage controller 298, between memory controller 299 and the bus 150, or between storage controller 298 and the bus 150, such as that which is depicted by the alternative command mailbox 140 representations set forth in the above described locations within FIG. 2, and set apart as alternatives by the dashed lines. In some embodiments, multiple command mailboxes 140 are implemented within a single system to perform the functions described herein.

In one embodiment, where the command mailbox 140 is located between memory controller 299 and bus 150, and a direct data path between mailbox 140 and memory controller 299 is available, and a user specifies memory controller 299 as the specified memory location for storing replicated transactions, there is no need for the command mailbox 140 to actually change the destination address of the replicate transaction and insert the replicate transaction onto 150 as the replicate transaction will be claimed by the memory controller 299 regardless. The command mailbox 140, in accordance with such an embodiment, can thus verify that the replicate transaction's destination corresponds to the specified memory location in memory controller 299, and elect to copy the original transaction to a replicate transaction with the additional detail provided by such replicate transactions, and then push the replicate transaction into memory controller's 299 write queue (with a modified memory destination address) for storing using the direct data path to memory controller 299, while allowing the original transaction to proceed to its intended destination device without interruption.

In a particular embodiment, a mailbox peripheral or command mailbox device (e.g., 140) communicably interfaced with the bus monitors the data-path for the transaction via a signal analyzer that deciphers the data-path traversing the bus, selects the transaction, via a logic unit, from among the plurality of transactions based on selection criteria 275 stored within the mailbox peripheral device, and replicates, via a signal generator, the selected transaction and introduces the replicate transaction into the data-path via the signal generator.

Figure 3:
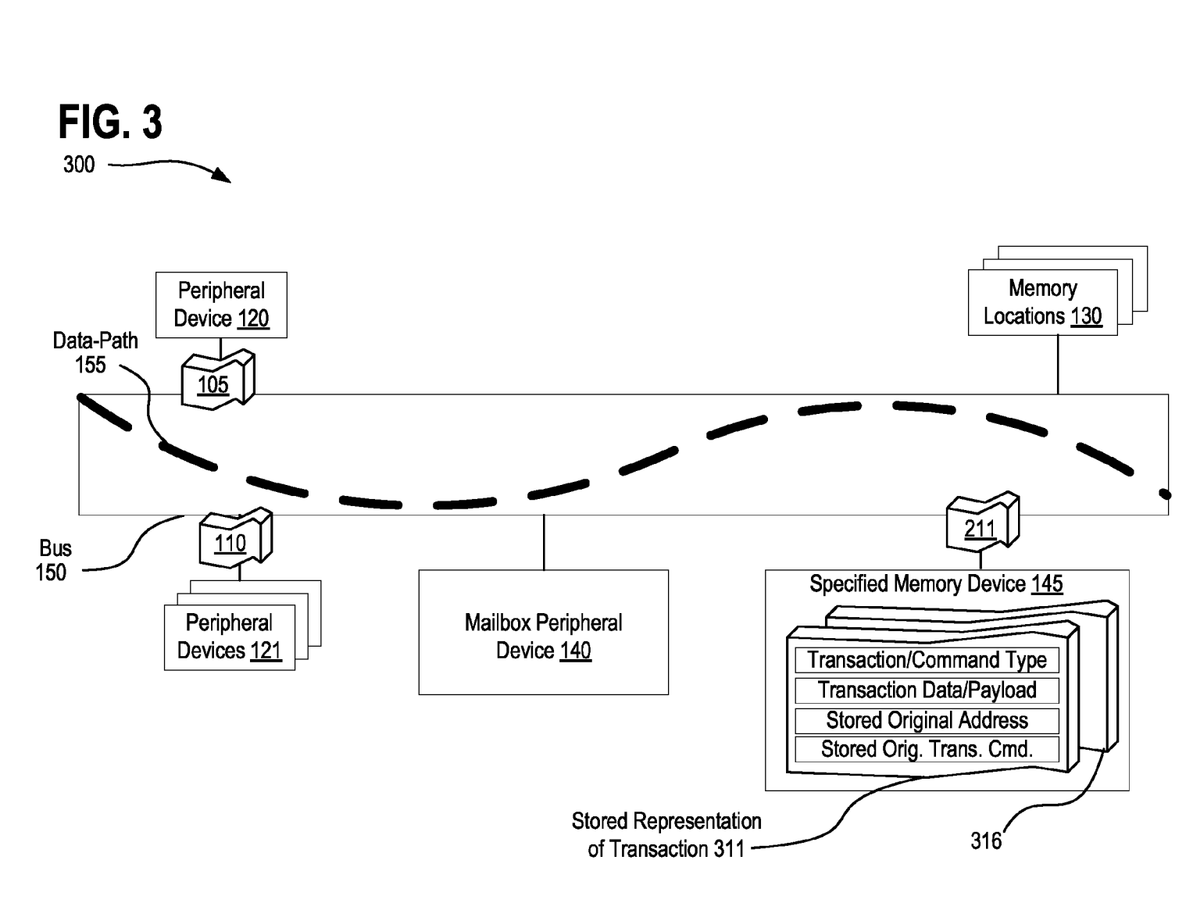
FIG. 3 is illustrates an alternative view of an architecture in which embodiments of the present invention may operate.

FIG. 3 is illustrates an alternative view of an architecture 300 in which embodiments of the present invention may operate. FIG. 3 introduces additional detail for stored representations of transactions (e.g., elements 311 and 316) at the specified memory device 145.

In one embodiment, replicate transaction 211 is processed at the specified memory device 145 specified by the modified destination address 226 of the replicate transaction 211. Such is depicted within FIG. 3 by replicate transaction 211 having reached the specified memory device 145 by traversing the data-path 155 of the bus in accordance with its modified destination address 226. In an alternative embodiment, the modified destination address 226 directs the replicate transaction 211 toward one of the memory locations 130 or a range within the memory locations 130 based on a user input or stored preferences. Storing of replicate transactions may occur in consecutive memory locations starting at a base address. In one embodiment, BASE_ADDR in memory location 130 contains a first replicate transaction, and BASE_ADDR+ an offset contains a second replicate transaction, and so forth. Hence multiple transactions which meet selection criteria 275 can be captured and stored continuously. These replicate transactions can later be extracted by a software debugger/parsing tool for viewing.

In a particular embodiment, processing the replicate transaction 211 at the specified memory device 145 or specified memory locations 130 includes the specified peripheral device (e.g., 130 or 145) storing a representation of the transaction 311 at the specified memory device 145 or memory locations 130. In one embodiment, storing the representation of the transaction 311 at the specified memory device 145 includes storing an original destination address 255 from the replicate transaction 211 in the stored representation of the transaction 311 as shown. In one embodiment, storing the representation of the transaction 311 at the specified memory device 145 includes storing a stored original transaction type and/or a stored original transaction command 217 from the replicate transaction 211 in the stored representation of the transaction 311 as shown. In one embodiment, storing the representation of the transaction 311 at the specified memory device 145 includes storing transaction data that accompanies the replicate transaction 211 as a payload at the specified memory device. Other information derived from the replicate transaction may also be stored in the representation of the transaction 311, including tags, IDs, traffic class, virtual channel, interrupt vector information, and other information supported by the particular bus and transaction architecture that enables a user to identify, for example, an initiator of a transaction, or any other information that can be extracted from a bus architecture which may prove useful in later debug activities.

Additional stored representations of transactions, or all representations of transactions, may obviously be saved or directed toward a specified device, such as that depicted by stored representation of a transaction at element 316. Which transactions are selected for replication and directed to be stored at the specified device depends upon user input, stored user preferences, and selection criteria available to the command mailbox 140.

In one embodiment, monitoring the data-path 155 for the transaction (e.g., 110) includes monitoring the data-path 155 for the transaction 110 among a plurality of transactions (105, 110, and 115) traversing the data-path 155. Some, or all such transactions may be monitored and selected depending on selection criteria.

In one embodiment, the transaction 110 is selected from among the plurality of transactions (105, 110, and 115) traversing the data-path 155 based on the original destination address 225, an originating address corresponding to a device that initiated the original transaction (e.g., the address of 120, 121, 125, 130, or 145), or a combination of the original destination address and the originating address. In an alternative embodiment, the transaction 110 is selected from among the plurality of transactions traversing the data-path based on the original destination address 225 falling within a range of original destination addresses, an originating address of an originating device falling within a range of originating addresses, or a combination of the original destination address and the originating address each falling within a specified range of addresses. Transaction types, transaction commands, and/or initiator identities or addresses may also be used to filter out transactions, as may any particular data field or value that can be identified within a transaction by the command mailbox. In another embodiment, all of the plurality of transactions traversing the data-path 155 are selected and processed based on a user input to replicate and store all such transactions.

In one embodiment, monitoring the data-path for the transaction among a plurality of transactions traversing the data-path includes selecting and processing multiple transactions from among the plurality of transactions traversing the data-path based on a user input, where the multiple transactions are associated with a plurality of different originating devices, where the multiple transactions encompass a plurality of different transaction types, and where the multiple transactions carry a plurality of different transaction data payloads.

The ability to select only a subset, or filter the transactions, for only those transactions which match or meet a specified criteria is unique benefit over that which is feasible through conventional mechanisms. Such conventional mechanisms do not permit the ability to monitor transactions and select only those which meet specified criteria, before capturing the data. Filtering out unwanted or unnecessary data later is more prone to error and adds computational overhead and additional requirements, compared with the ability to filter earlier in the process, prior to the data ever being replicated or copied to a separate location for debug or diagnostics.

Conversely, the ability to capture all transactions or a very large number of transactions may also be of benefit to those in the arts who utilize diagnostic tools. Conventional mechanisms and systems do not allow the capture of very large number of varying transaction types, transactions destined for different peripheral devices, or transactions originating from different devices simultaneously, simply due to a physical constraint on the number of pins and probes that are available with conventional systems. For example, it is plainly not feasible to have a system with hundreds or even thousands of pins for probe leads, as configuration/setup and use of such a system would be enormously complex given the need to actually physically connect each and every individual probe lead to a correct location. In contrast, the command mailbox 140 is integrated onto the bus or interfaced with other data-path communication busses allowing the command mailbox to have a view of all transactions which traverse through that particular bus, and selectively choose which of the many transactions will be acted upon as described above.

Use of conventional mechanisms for internal buses such as buses inside a System on a Chip (SoC) IC design, presents additional problems, since internal bus transaction signals are not directly visible to user and must be selectively pulled out to external IO pins for probing using logic analyzers. Pulling such signals out of the SoC IC requires the use of system package IO pins, requiring functional IO pins to be shared or multiplexed with the internal signal sources.

Further limitations of such conventional mechanisms include, for example, a limitation on the number of internal bus signals a user is able to observe at one single point of time, limited by the number of IO pins available on the system package (e.g., a system bus with 32-bit address and 64-bit data (plus other control signals) would require at least 96 total IO pins to be effectively extracted by a logic analyzer in its complete form. Hence additional hardware and platform resources are needed.

Further still, shared IO pins used for extracting the internal bus signals are no longer usable to perform their original function (e.g., if the upper 32 data bits of a DDR controller's IO pins and 20 GPIO (General Purpose Input Output) pins are used for extracting internal bus data, then DDR memory is effectively reduced to a 32-bit memory instead of the original 64-bit, which negatively impacts performance and further renders half the DIMM unusable. Further, the GPIO pins cannot be used for GPIO functionality when they are being used for extracting internal bus signals and any shared IO pins used for extracting internal bus signals cannot be used for their originally intended functionality. Increasing the number of IO pins on a system package for the sole purpose of extracting internal bus signals will incur prohibitive costs and unacceptably increase the complexity of system package design as the total number of IO pins of a system must be increased to accommodate the requirement. For these reasons, such an architecture is not commercially viable and is not available to the marketplace.

Further limitations exist with respect to a complete system, such as a computer used for software design and debugging, in which it is very inconvenient for a user to physically connect hardware probes to the system or modify the platform to facilitate debugging and probing of internal bus signals within the system, as doing so requires at least a partial disassembly of the system itself and places the system at risk for electrostatic discharge (ESD) damage. Embodiments described herein utilize existing hardware, such as additional capacity in system memory for storing replicated transactions in conjunction with the command mailbox disclosed, so that no change to the original hardware is necessary, as the command mailbox provides the required functionality without necessitating the connection of physical probes to the system, thus providing significant convenience and cost savings to an end user. Furthermore, extracting internal bus signals using a conventional logic analyzer will incur additional platform costs and increase platform size as logic analyzer probe interfaces must be added to the system, in addition to the cost of purchasing a logic analyzer.

Further still, some transactions are consumed by target devices, such as posted write transactions, or transactions may change the state of a target device (e.g., interrupt transactions). Hence it may not be possible for a processor to trap these transactions using conventional mechanisms or conventional software debugging tools. In contrast, embodiments described herein can provide such functionality, regardless of whether the transaction is consumed or changes the state of the target device, allowing an end user to actually see (e.g., monitor) what happens on the bus in real time, such as monitor what transactions go to a particular device and from which initiators, in addition to their actual sequence of occurrence, or monitor for when a processor communicates with a device on the, which is especially important to debugging multi-threaded applications.

Additionally, because system designer can hide the protocol of its internal buses from a user of the system needing to debug software, the end user must know the protocol of the bus and program a logic analyzer accordingly, if one is to be used to effectively interpret or decode data extracted from the bus. In contrast, embodiments of the command mailbox disclosed replicates transactions and stores useful data in memory (e.g., as a stored transaction representation 311), and thus the problem of a hidden bus implementation or protocol from user is overcome. Protocol adherence is implemented by a signal analyzer and signal generator inside the command mailbox. Hence a system designer is able to release the debugger to an end user without having to reveal its proprietary bus architecture or protocol.

Finally, unlike conventional software debugging mechanisms, embodiments disclosed herein introduce minimal disturbance to software execution flow on a system, since no additional instructions are added to the original processor executable code for trapping transactions.

Another benefit made possible by embodiments described herein is the ability for a user to access a real-time image of non-memory typed transactions, such as those transactions which are not sent to a storage location, be it RAM or mass storage. For example, conventional systems often simply cannot access any signal once it is directed toward a non-memory type peripheral, such as a communication interface, an audio or video interface, and so forth, if the initial design of that interface did not accommodate such a consideration with an appropriate probe point. Integrating such physical probe points is further not without cost or complexity, and thus, many designs simply forgo such a consideration, in favor of a lower cost and simplified design. In contrast, the command mailbox 140 may be positioned between such a peripheral device and the bus, or on the bus, and monitor for transactions directed toward such a device, or from such a device, or both, and then replicate those transactions to a specified location for diagnostic purposes, allowing a real time view of data which would may otherwise be impossible to obtain due to hardware constraints. This is possible with the command mailbox regardless of whether probe points exist on the peripheral device or not.

In situations where firmware or software tools are utilized to access non-memory typed transactions such as those above, the data still cannot be made available real-time, as it is not the transaction itself that its replicated by such tools, but rather, software must be executed to seek out the appropriate data points from firmware parameter values or hardware registers and then report the values out in some manner. Even if this can be done quickly, it will not be done in real time, and it will not reflect the actual transaction, but rather, a reconstruction of data or changes resulting from the transaction. Such differences in of themselves, could frustrate debug efforts, since the actual data values and transaction commands sent to a non-memory typed device will simply be unavailable, and only a later imperfect translation or reconstruction of the desired transaction can be obtained.

Figure 4:
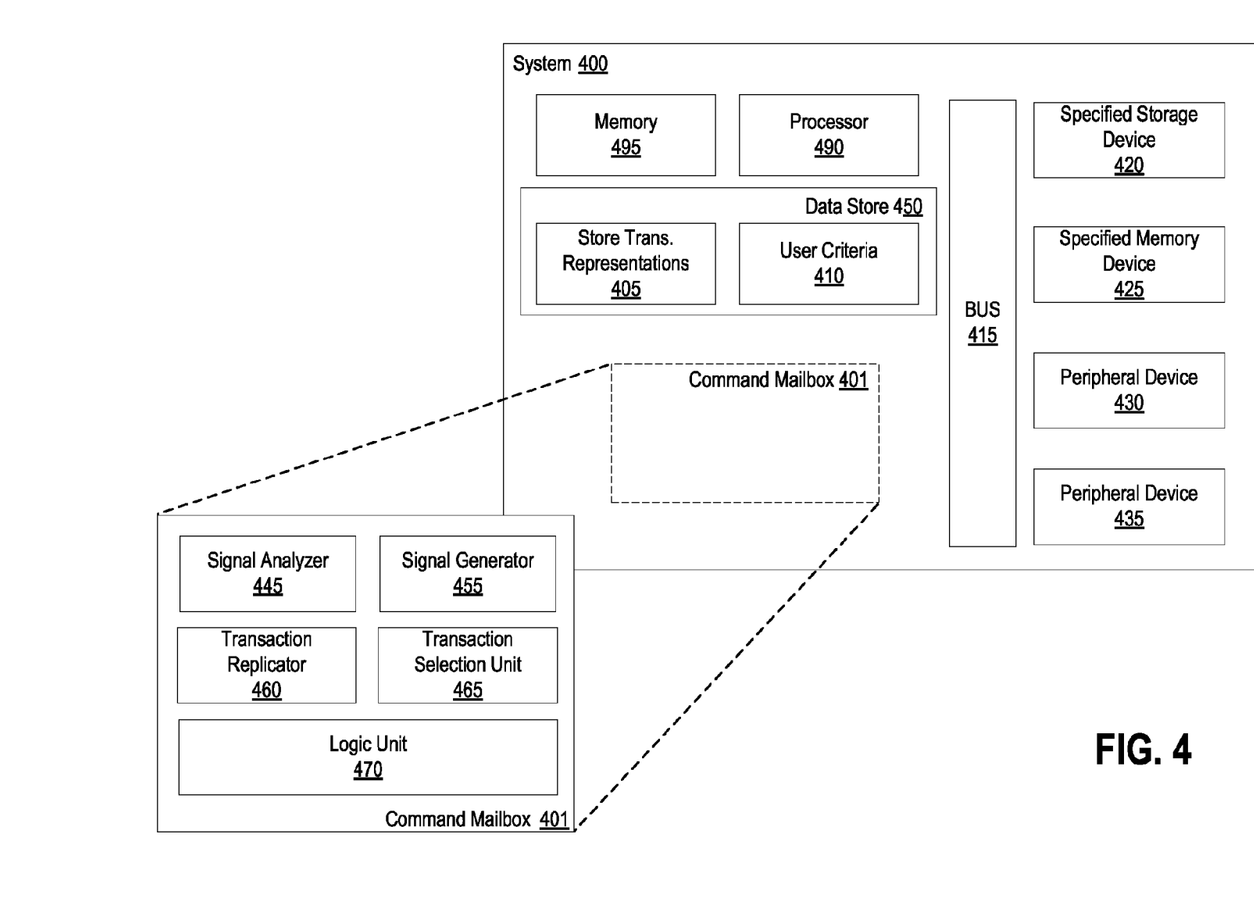
FIG. 4 is a diagrammatic representation of a command mailbox and a system in which an embodiment of the command mailbox may operate.

FIG. 4 is a diagrammatic representation of a command mailbox 401 and a system 400 in which an embodiment of the command mailbox 401 may operate. The dashed lines extending from command mailbox 401 of FIG. 4 are meant to indicate that the command mailbox may be physically distinct from system 400 or integrated within system 400, depending on the particular embodiment.

System 400 includes a memory 495 and a processor 490. For example, memory 495 may store instructions to be executed and processor 490 may execute such instructions. System 400 includes bus 415 to transfer transactions within system 400 among a plurality of peripheral devices communicably interfaced with the bus 415. The plurality of peripheral devises include peripheral devices 430 and 435, specified storage device 420, and specified memory device 425. System 400 further includes data store 450 (e.g., a memory, hard drive, or other system storage location) which in turn includes stored transaction representations 405 and user criteria 410.

Distinct from system 400, command mailbox 401 (also referred to herein as a "mailbox peripheral device" 401) includes logic unit 470, transaction replicator 460, transaction selection unit 465, signal analyzer 445, and signal generator 455. Command mailbox 401 may be integrated with system 400 at manufacture, or produced separately and installed later, depending on the selected embodiment to be practiced, and consistent with that which is taught herein.

In one embodiment, mailbox peripheral device 401 is communicably interfaced with bus 415 to monitor a data-path between the plurality of devices (420, 425, 430, 435) for a transaction uniquely addressed to one of the plurality of devices other than the mailbox peripheral device itself.

In one embodiment, the mailbox peripheral device 401 is to generate a replicate transaction from the transaction, change a destination address of the replicate transaction to a specified storage device 420 communicably interfaced with the bus 415, and insert the replicate transaction into the data-path to progress the replicate transaction toward the specified storage device 425 based on the modified destination address.

In a particular embodiment, the mailbox peripheral device 401 is to allow the original transaction to proceed to one of the plurality of devices as uniquely addressed by the transaction.

In one embodiment, mailbox peripheral device 401 utilizes an integrated signal analyzer 445 to monitor the data-path between the plurality of devices (420, 425, 430, 435) for the transaction.

In an embodiment, mailbox peripheral device 401 utilizes logic unit 470 to change the destination address of the replicate transaction to the specified storage device 420. Logic unit 470 may also keep track of the destination base address and increment the destination address for every consecutive replicate transaction to be stored in memory.

In one embodiment, mailbox peripheral device 401 utilizes signal generator 455 to insert the replicate transaction into the data-path to progress the replicate transaction toward the specified storage device 420, where the replicate transaction embodies the changed destination address and where the replicate transaction is to progress toward the specified storage device 420 via the bus 415 based on the changed destination address. In an alternative embodiment, mailbox peripheral device 401 utilizes signal generator 455 to release, insert, inject, or direct the replicate transaction onto the data-path.

In a particular embodiment, mailbox peripheral device 401 utilizes transaction selection unit 465 to select a transaction for replication from the data-path responsive to the transaction being monitored by signal analyzer 445. In a particular embodiment, transaction selection unit 465 is to select the transaction for replication based on a user specified criteria derived from a user input or from saved user preferences.

In one embodiment, mailbox peripheral device 401 utilizes transaction replicator 460 to replicate the selected transaction to a replicate transaction and implement the changed destination address into the replicate transaction based on an instruction from logic unit 470 providing the changed destination address of the specified storage device 420. In a particular embodiment, transaction replicator 460 replicates the transaction without interrupting the transaction on the bus 415.

Figure 5A:
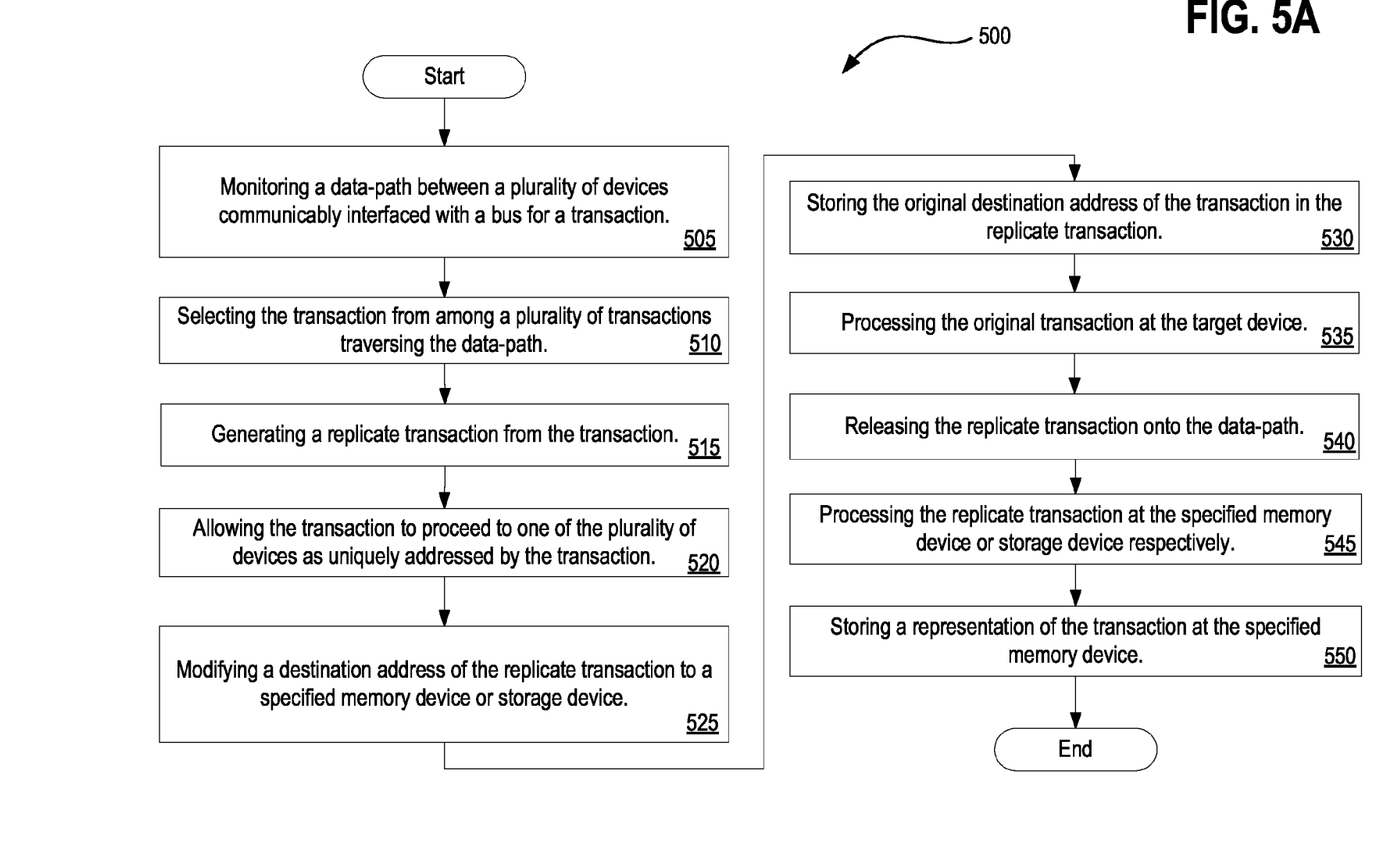
FIG. 5A is a flow diagram illustrating a method for monitoring a data-path on a bus for a transaction, in accordance with one embodiment of the present invention.
Figure 5B:
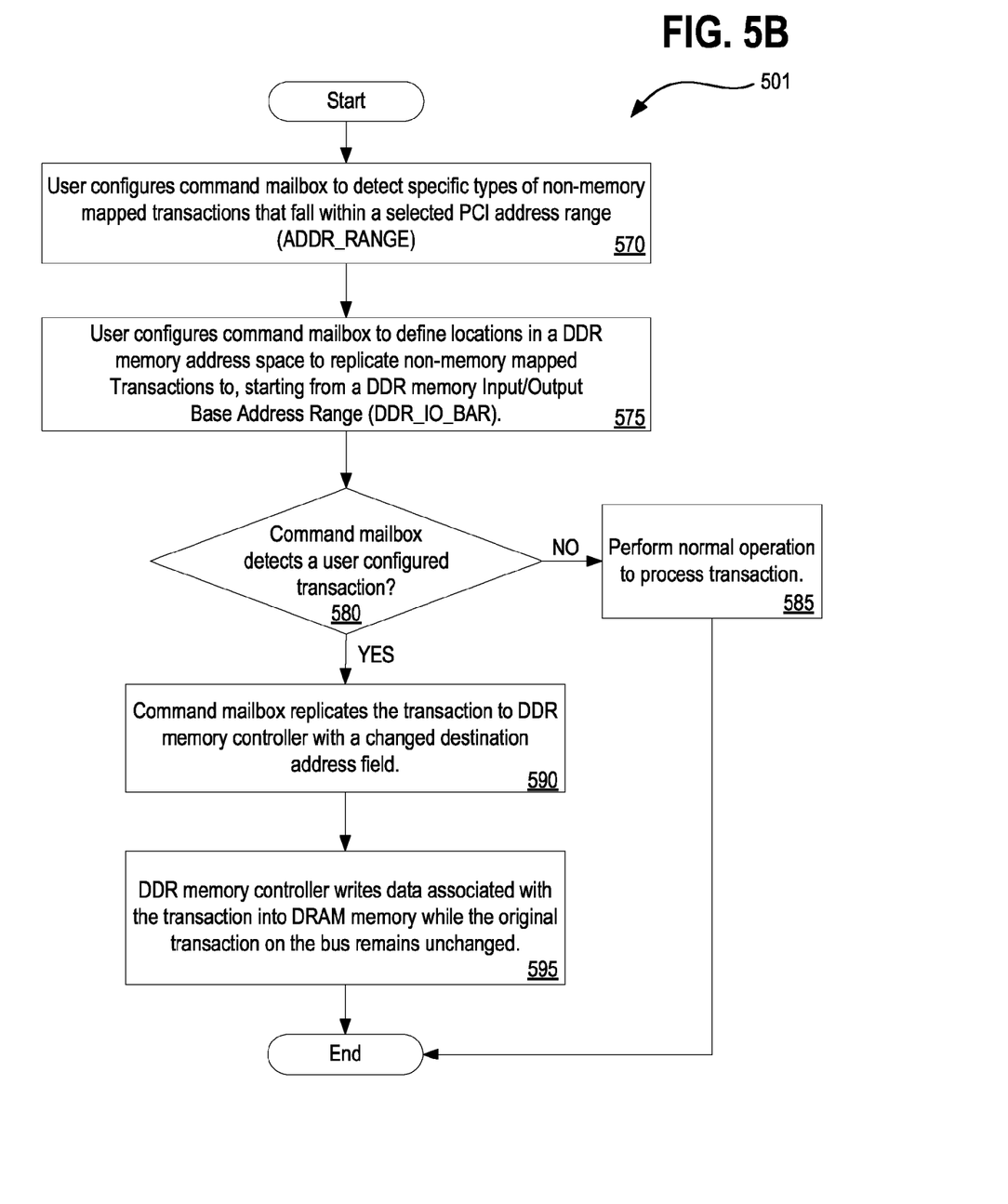
FIG. 5B is an alternative flow diagram illustrating a method for monitoring a data-path on a bus for a transaction, in accordance with one embodiment of the present invention.

FIGS. 5A and 5B depict flow diagrams illustrating method 500 and alternative method 501 for monitoring a data-path on a bus for a transaction, in accordance with one embodiment of the present invention. Methods 500 and 501 may be performed by processing logic that may include hardware (e.g., circuitry, dedicated logic, programmable logic, microcode, etc.), software (e.g., instructions run on a processing device to perform hardware simulation), or a combination thereof. In one embodiment, methods 500 and 501 are performed by a command mailbox, such as command mailbox 401 of FIG. 4. In an alternative embodiment, methods 500 and 501 are performed by command mailbox 401 in conjunction with a system, such as system 400 in conjunction with command mailbox 401, as depicted in FIG. 4.

Referring to FIG. 5A first, method 500 begins with processing logic monitoring a data-path between a plurality of devices communicably interfaced with a bus for a transaction (block 505). At block 510, processing logic selects the transaction from among a plurality of transactions traversing the data-path.

At block 515, processing logic copies the transaction to a replicate transaction and allows the transaction to proceed to one of the plurality of devices as uniquely addressed by the transaction (block 520). At block 525, processing logic modifies a destination address of the replicate transaction to a specified memory device or storage device. At block 530, processing logic stores the original destination address of the transaction in the replicate transaction. At block 535, processing logic processes the original transaction at the target device.

At block 540, processing logic releases the replicate transaction onto the data-path. At block 545, processing logic processes the replicate transaction at the specified memory device or storage device respectively. And at block 550, processing logic stores a representation of the transaction at the specified memory device or storage device respectively.

FIG. 5B is an alternative flow diagram illustrating method 501 for monitoring a data-path on a bus for a transaction, in accordance with one embodiment of the present invention. Method 501 begins at block 570 with a user configuring a command mailbox to detect specific types of non-memory mapped transactions that fall within a selected PCI address range (ADDR_RANGE). At block 575, the user configures the command mailbox to define locations in a DDR memory address space to replicate non-memory mapped transactions to, starting from a specified DDR memory Input/Output Base Address Range (DDR_IO_BAR).

At decision block 580, the command mailbox determines if a user configured transaction is detected. The "no" branch from decision block 580 proceeds to block 585, where normal operations are performed to process the transaction (e.g., transaction is not replicated), and method 501 then ends. If the "yes" branch from decision block 580 is followed to block 590, the command mailbox replicates the transaction to a DDR memory controller with a changed destination address field. At block 595, the DDR memory controller writes data associated with the transaction into DRAM memory while the original transaction on the bus remains unchanged. Method 501 then ends. Methods 500 and 501 may be repeated continuously to monitor and detect multiple user specified transactions within a system. Obviously, not every labeled block of Methods 500 and 501 are required in all embodiments, and ordering of labeled blocks other than that set forth above is possible as well.

Figure 6:
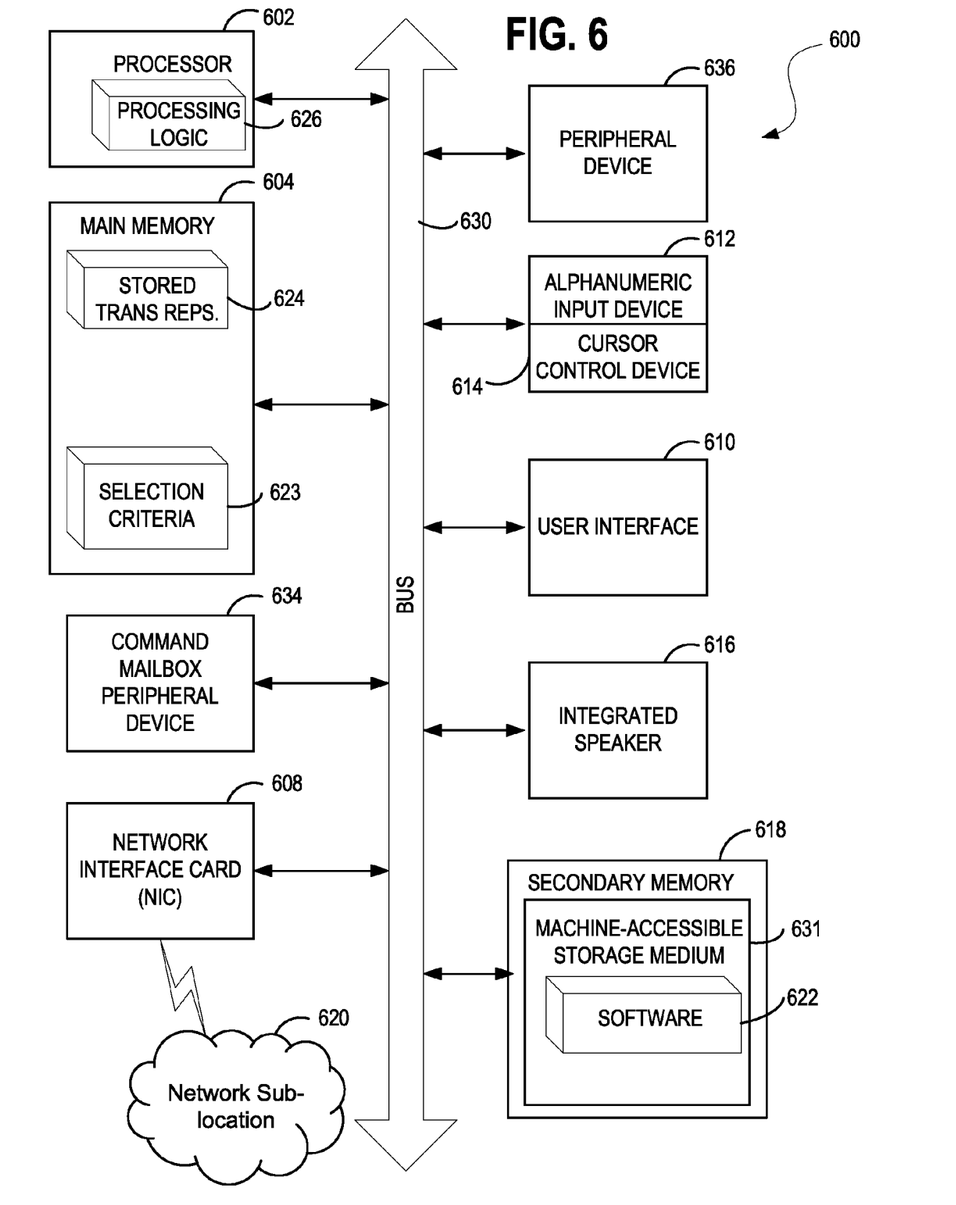
FIG. 6 illustrates a diagrammatic representation of a machine in the exemplary form of a computer system, in accordance with one embodiment of the present invention.

FIG. 6 illustrates a diagrammatic representation of a machine in the exemplary form of a computer system 600, within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processor 602, a main memory 604 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), etc.), and a secondary memory 618 (e.g., a data storage device), which communicate with each other via a bus 630. Main memory 604 includes a stored transaction representation 624 and selection criteria 623 which operate in conjunction with processing logic 626 and processor 602 to perform the methodologies discussed herein.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 602 may also be one or more special-purpose processing devices such as an application specific integrated circuit (ASIC), a field programmable gate array (FPGA), a digital signal processor (DSP), network processor, or the like. Processor 602 is configured to execute the processing logic 626 for performing the operations and steps discussed herein.

The computer system 600 may further include a network interface card 608. The computer system 600 also may include a user interface 610 (such as a video display unit, a liquid crystal display (LCD), or a cathode ray tube (CRT)), an alphanumeric input device 612 (e.g., a keyboard), a cursor control device 614 (e.g., a mouse), and a signal generation device 616 (e.g., a speaker). The computer system 600 may further include peripheral device 636 (e.g., wireless or wired communication devices, memory devices, storage devices, audio processing devices, video processing devices, etc., and command mailbox peripheral device 634.

The secondary memory 618 may include a machine-readable storage medium (or more specifically a computer-readable storage medium) 631 on which is stored one or more sets of instructions (e.g., software 622) embodying any one or more of the methodologies or functions described herein. The software 622 may also reside, completely or at least partially, within the main memory 604 and/or within the processing device 602 during execution thereof by the computer system 600, the main memory 604 and the processing device 602 also constituting machine-readable storage media. The software 622 may further be transmitted or received over a network 620 via the network interface device 608.

While the machine-readable storage medium 631 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. The scope of the invention is therefore determined in reference to the appended claims, along with the full scope of equivalents to which such claims are entitled.

What is claimed is:

1. A method comprising:
monitoring a data-path between a plurality of devices communicably interfaced with a bus for transactions uniquely addressed to one of the plurality of devices, wherein one or more of the transactions are to be replicated and stored as a representation of the original transaction;
selecting which of the transactions are to be replicated and stored based upon user input or stored user preferences;
wherein, for each transaction selected, the method further comprises:
generating a replicate transaction from the original transaction;
allowing the original transaction to proceed to one of the plurality of devices as uniquely addressed by the original transaction;
modifying a destination address of the replicate transaction to a specified memory device communicably interfaced with the bus; and
releasing the replicate transaction onto the data-path, wherein the replicate transaction proceeds to the specified memory device to be stored based on the modified destination address.

2. The method of claim 1, wherein the one device of the plurality of devices uniquely addressed by the original transaction comprises a target device of the transaction, and wherein the target device of the original transaction corresponds to an original destination address of the original transaction.

3. The method of claim 2, further comprising:
processing the original transaction at the target device specified by the original destination address; and
processing the replicate transaction at the specified memory device as specified by the modified destination address, wherein the specified memory address is based on a user input or a stored user preference.

4. The method of claim 2, wherein processing the replicate transaction at the specified memory device comprises storing a representation of the original transaction at the specified memory device.

5. The method of claim 4, further comprising:
storing the original destination address of the original transaction in the replicate transaction; and
wherein storing the representation of the original transaction at the specified memory device comprises storing original destination address with the representation of the original transaction.

6. The method of claim 4, wherein storing the representation of the original transaction at the specified memory device comprises:
storing the original destination address of the original transaction at the specified memory device;
storing an origination address associated with the original transaction at the specified memory device, wherein the origination address corresponds to one of the plurality of devices communicably interfaced with the bus that initiated the original transaction;
storing a transaction type corresponding to the original transaction at the specified memory device; and
storing transaction data at the specified memory device, wherein the transaction data corresponds to payload data of the original transaction.

7. The method of claim 4, wherein all information extractable from the bus based on a bus architecture for the bus is stored in the replicate transactions, wherein the information extractable from the bus includes at least one or more of transaction commands, tags, IDs, traffic class, virtual channel, interrupt vector information, and information identifying an initiator of a transaction.

8. The method of claim 2, wherein one or more fields of the generated replicate transaction are selected from among a plurality of fields available for copying to the replicate transaction based on a user input or a stored user preference.

9. The method of claim 2, wherein monitoring the data-path for the transactions comprises monitoring the data-path for the original transaction among a plurality of transactions traversing the data-path.

10. The method claim 9, wherein monitoring the data-path for the transactions among the plurality of transactions traversing the data-path comprises:
selecting the original transaction from among the plurality of transactions traversing the data-path based on a specified transaction type, wherein the specified transaction type is selected from an Input/Output (IO) read/write request, a configuration read/write request, a transaction acknowledgement, an interrupt request, or another transaction type as defined by a bus architecture for the bus.

11. The method claim 9, wherein monitoring the data-path for the transactions among the plurality of transactions traversing the data-path comprises:
selecting the original transaction from among the plurality of transactions traversing the data-path based on the original destination address, an originating address corresponding to a device that initiated the original transaction, or a combination of the original destination address and the originating address.

12. The method claim 9, wherein monitoring the data-path for the transactions among the plurality of transactions traversing the data-path comprises:
selecting the original transaction from among the plurality of transactions traversing the data-path based on the original destination address falling with in a range of original destination addresses, an originating address of an originating device falling within a range of originating addresses, or a combination of the original destination address and the originating address each falling within a specified range of addresses.

13. The method of claim 9, monitoring the data-path for the transactions among a plurality of transactions traversing the data-path comprises selecting and processing all of the plurality of transactions traversing the data-path based on a user input or a stored user preference.

14. The method of claim 9, wherein monitoring the data-path for the transactions among a plurality of transactions traversing the data-path comprises selecting and processing multiple transactions from among the plurality of transactions traversing the data-path based on a user input or a stored user preference, wherein the multiple transactions are associated with a plurality of different originating devices, wherein the multiple transactions comprise a plurality of different transaction types, and wherein the multiple transactions carry a plurality of different transaction data payloads.

15. The method of claim 1:
wherein monitoring the data-path between the plurality of devices communicably interfaced with the bus for the transactions comprises monitoring signals traversing the data-path via a signal analyzer communicably interfaced with the bus;

wherein generating the replicate transaction and modifying the destination address of the replicate transaction comprises generating the replicate transaction and modifying the destination address of the replicate transaction via a signal generator communicably interfaced with the bus.

16. The method of claim 1, wherein a mailbox peripheral device communicably interfaced with the bus monitors the data-path for the transactions, the mailbox peripheral device comprising a signal analyzer to decipher the data-path traversing the bus, a logic unit to select the original transaction from among the plurality of transactions based on selection criteria stored within the mailbox peripheral device, and a signal generator to replicate the selected transaction and introduce the replicate transaction into the data-path.

17. A system comprising:
a memory to store instructions;
a processor to execute instructions stored in the memory;
a bus to transfer transactions within the system among a plurality of peripheral devices communicably interfaced with the bus;
a mailbox peripheral device communicably interfaced with the bus to monitor a data-path between the plurality of devices for transactions uniquely addressed to one of the plurality of devices other than the mailbox peripheral device, wherein one or more of the transactions to be replicated and stored as a representation of the original transaction;
the mailbox peripheral device to select which of the transactions are to be replicated and stored based upon user input or stored user preferences;
wherein, for each transaction selected:
the mailbox peripheral device to generate a replicate transaction from the original transaction;
the mailbox peripheral device to change a destination address of the replicate transaction to a specified storage device communicably interfaced with the bus; and
the mailbox peripheral device to insert the replicate transaction into the data-path to progress the replicate transaction toward the specified storage device based on the modified destination address.

18. The system of claim 17, wherein the mailbox peripheral device to generate the replicate transaction from the original transaction comprises the mailbox peripheral device to allow the original transaction to proceed to one of the plurality of devices as uniquely addressed by the original transaction without interruption.

19. The system of claim 17, wherein the mailbox peripheral device comprises:
a signal analyzer, wherein the signal analyzer to monitor the data-path between the plurality of devices for the transactions;
a logic unit, wherein the logic unit to change the destination address of the replicate transaction to the specified storage device; and
a signal generator, wherein the signal generator to insert the replicate transaction into the data-path to progress the replicate transaction toward the specified storage device, wherein the replicate transaction comprises the changed destination address and is to progress toward the specified storage device via the bus, based on the changed destination address.

20. A non-transitory computer readable storage medium having instructions stored thereon that, when executed by a processor, cause a machine to perform operations comprising:
monitoring a data-path between a plurality of devices communicably interfaced with a bus for transactions uniquely addressed to one of the plurality of devices, wherein one or more of the transactions are to be replicated and stored as a representation of the original transaction;
selecting which of the transactions are to be replicated and stored based upon user input or stored user preferences;
wherein, for each transaction selected, the method further comprises:
generating a replicate transaction from the original transaction;
allowing the original transaction to proceed to one of the plurality of devices as uniquely addressed by the original transaction;
modifying a destination address of the replicate transaction to a specified memory device communicably interfaced with the bus; and
releasing the replicate transaction onto the data-path, wherein the replicate transaction proceeds to the specified memory device to be stored based on the modified destination address.

21. The non-transitory computer readable storage medium of claim 20, wherein the method further comprises:
processing the original transaction at the one of the plurality of devices uniquely addressed by the original transaction; and
processing the replicate transaction at the specified storage location specified by the modified destination address, wherein processing the replicate transaction comprises storing a representation of the original transaction at the specified storage location.

22. A command mailbox comprising:
an interface with a bus of a system, wherein the command mailbox to monitor, via the bus, a data-path between a plurality of devices connected with the system for transactions uniquely addressed to one of the plurality of devices other than the command mailbox, wherein one or more of the transactions are to be replicated and stored as a representation of the original transaction;
a signal analyzer to monitor the data-path of the bus communicably interfaced with the command mailbox;
a transaction selection unit to select a transaction for replication from the data-path responsive to the transaction being monitored by the signal analyzer, wherein the transaction selection unit to select the transaction for replication based upon user input or stored user preferences;
wherein, for each transaction selected by the transaction selection unit:
a transaction replicator is to generate a replicate transaction from the selected transaction;
a logic unit is to change a destination address of the replicate transaction to a specified storage device; and
a signal generator is to release the replicate transaction onto the data-path of the system via the bus communicably interfaced with the command mailbox, the released replicate transaction to be stored at the specified storage device.

23. The command mailbox of claim 22:
wherein the transaction selection unit to select the transaction for replication based on a user specified criteria;
wherein the transaction replicator replicates the original transaction without interrupting the original transaction on the bus; and
wherein the signal generator to release the replicate transaction onto the data-path comprises the replicate transaction to progress toward the specified storage device based on the changed destination address of the replicate transaction via the bus.

* * * * *